United States Patent
Park

(10) Patent No.: US 8,933,922 B2
(45) Date of Patent: Jan. 13, 2015

(54) DC-DC CONVERTER AND ORGANIC LIGHT EMITTING DISPLAY INCLUDING THE SAME

(75) Inventor: Sung-Cheon Park, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 754 days.

(21) Appl. No.: 13/249,684

(22) Filed: Sep. 30, 2011

(65) Prior Publication Data

US 2013/0002639 A1    Jan. 3, 2013

(30) Foreign Application Priority Data

Jun. 30, 2011 (KR) .................. 10-2011-0064433

(51) Int. Cl.
*G09G 5/00* (2006.01)
*H02M 3/156* (2006.01)
*G09G 3/32* (2006.01)

(52) U.S. Cl.
CPC ............ *H02M 3/156* (2013.01); *G09G 3/3225* (2013.01); *G09G 2300/0426* (2013.01); *G09G 2330/026* (2013.01); *G09G 2330/028* (2013.01)
USPC .............. 345/212; 345/76; 345/211; 323/282

(58) Field of Classification Search
USPC ...................... 345/76–84, 204–214, 690–699; 315/169.3; 323/282–290
See application file for complete search history.

(56) References Cited

U.S. PATENT DOCUMENTS

| 5,412,308 | A  | * | 5/1995  | Brown   | 323/267 |
|-----------|----|---|---------|---------|---------|
| 8,334,824 | B2 | * | 12/2012 | Park    | 345/82  |
| 8,791,935 | B2 | * | 7/2014  | Park    | 345/211 |
| 2001/0004204 | A1 | * | 6/2001 | Mitsuaki | 323/224 |
| 2007/0091036 | A1 | * | 4/2007 | Han et al. | 345/82 |
| 2007/0176585 | A1 | * | 8/2007 | He et al. | 323/282 |
| 2008/0246702 | A1 | * | 10/2008 | Lee et al. | 345/77 |
| 2010/0171478 | A1 | * | 7/2010 | He et al. | 323/282 |
| 2010/0220039 | A1 | * | 9/2010 | Park et al. | 345/76 |
| 2011/0115777 | A1 | * | 5/2011 | Park | 345/212 |
| 2011/0273422 | A1 | * | 11/2011 | Park | 345/211 |
| 2013/0057529 | A1 | * | 3/2013 | Lee et al. | 345/211 |
| 2013/0235010 | A1 | * | 9/2013 | Park | 345/209 |
| 2013/0235016 | A1 | * | 9/2013 | Seo et al. | 345/212 |
| 2013/0235017 | A1 | * | 9/2013 | Park | 345/212 |
| 2013/0241808 | A1 | * | 9/2013 | Kwon et al. | 345/76 |
| 2014/0022149 | A1 | * | 1/2014 | Kwon et al. | 345/76 |

FOREIGN PATENT DOCUMENTS

KR    10-0833764 B1    5/2008

* cited by examiner

*Primary Examiner* — Dmitriy Bolotin
(74) *Attorney, Agent, or Firm* — Knobbe, Martens, Olson & Bear, LLP

(57) ABSTRACT

A DC-DC converter and an organic light emitting display including the same are disclosed. The DC-DC converter generates first and second power voltages for the organic light emitting display with an inverting converter and a boost converter. The current of the converters is monitored, and if the currents exceed a threshold, the associated converter is stopped to prevent further damage to the display.

24 Claims, 3 Drawing Sheets

DC-DC CONVERTER AND ORGANIC LIGHT EMITTING DISPLAY INCLUDING THE SAME

CROSS-REFERENCE TO RELATED APPLICATIONS

This application claims priority to and the benefit of Korean Patent Application No. 10-2011-0064433, filed on Jun. 30, 2011, in the Korean Intellectual Property Office, the entire content of which is incorporated herein by reference.

BACKGROUND

1. Field

The disclosed technology relates to a DC-DC converter and an organic light emitting display including the same, and more particularly, to a DC-DC converter capable of preventing a failure caused by a short circuit in a power source line and an organic light emitting display including the same.

2. Description of the Related Technology

Recently, various flat panel display (FPD) technologies having reduced weight and volume as compared with cathode ray tubes (CRT) have been developed. By way of example, FPDs include liquid crystal displays (LCD), field emission displays (FED), plasma display panels (PDP), and organic light emitting displays.

Organic light emitting displays display images using organic light emitting diodes (OLED) that generate light through the re-combination of electrons and holes. An organic light emitting display has fast response and low power consumption.

In general, an OLED display is either a passive matrix type OLED display (PMOLED) or an active matrix type OLED display (AMOLED), according to a method of driving the OLED display.

An AMOLED includes a plurality of gate lines, a plurality of data lines, a plurality of power source lines, and a plurality of pixels coupled to the above lines to be arranged in the form of a matrix. A DC-DC converter for changing an input power voltage supplied from the outside to generate power voltages required for driving the pixels is included in the organic light emitting display. The DC-DC converter may supply a positive power voltage and a negative power voltage for driving the pixels to the pixels through the respective power source lines.

However, due to the shock generated during using the organic light emitting display, a short circuit may arise between the power source lines. In this case, the display may fail, or even worse, a fire may result.

SUMMARY OF CERTAIN INVENTIVE ASPECTS

One inventive aspect is a DC-DC converter. The converter includes a boost converter with a first switching element, a second switching element, and a first inductor. The converter also includes an inverting converter with a third switching element, a fourth switching element, and a second inductor. In addition, the converter includes a switching controller for controlling the first, second, third, and fourth switching elements, and a current sensing unit for sensing an amount of current that flows through the first inductor and for supplying a first limit signal to the switching controller if the amount of sensed current is greater than or equal to a first reference current amount. The switching controller controls the first switching element and the second switching element to reduce the amount of current that flows through the first inductor if the first limit signal is received and turns off the first switching element and the second switching element if the first limit signal is supplied more than a reference number of times within a first reference time.

Another inventive aspect is an organic light emitting display. The display includes a pixel unit coupled to scan lines and data lines and has pixels that receive a first power voltage and a second power voltage. The display also includes a scan driver for supplying scan signals to the pixels through the scan lines, a data driver for supplying data signals to the pixels through the data lines, and a DC-DC converter for generating the first power voltage and the second power voltage. The DC-DC converter is configured to supply the generated first and second power voltages to the pixel unit, and includes a boost converter with a first switching element, a second switching element, and a first inductor. The converter also includes an inverting converter with a third switching element, a fourth switching element, and a second inductor. In addition, the converter includes a switching controller for controlling the first, second, third, and fourth switching elements, and a current sensing unit for sensing an amount of current that flows through the first inductor and for supplying a first limit signal to the switching controller if the amount of sensed current is greater than or equal to a first reference current amount. The switching controller controls the first switching element and the second switching element to reduce the amount of current that flows through the first inductor if the first limit signal is received and turns off the first switching element and the second switching element if the first limit signal is supplied more than a reference number of times within a first reference time.

BRIEF DESCRIPTION OF THE DRAWINGS

The accompanying drawings, together with the specification, illustrate exemplary embodiments, and, together with the description, serve to explain various principles and aspects.

DETAILED DESCRIPTION OF CERTAIN INVENTIVE EMBODIMENTS

Figure 1:
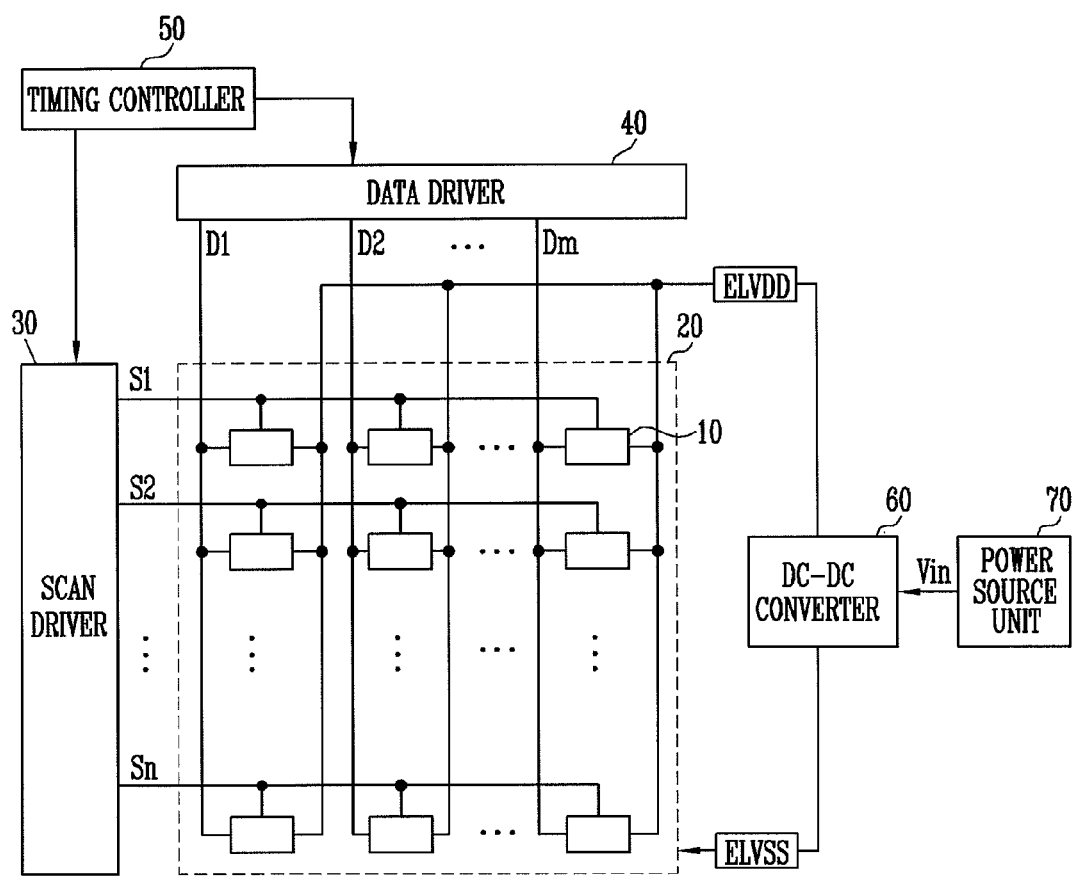
FIG. 1 is a block diagram illustrating an organic light emitting display including a DC-DC converter according to an embodiment.

Hereinafter, certain exemplary embodiments are described with reference to the accompanying drawings. Here, when a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals generally refer to like elements throughout. Detailed items of the other embodiments are included in detailed description and drawings.

Certain advantages and characteristics of certain features and methods of achieving the advantages and characteristics are described more fully with reference to the accompanying drawings, in which exemplary embodiments are shown. This invention may, however, be embodied in many different forms and should not be construed as being limited to the embodiments set forth herein. In the drawings, when a part is coupled to another part, the part may be directly coupled to another part and the part may be electrically coupled to another part with another element interposed. In the drawings, a part that is not related to a feature being discussed may be omitted for clarity of description. The same reference numerals in different drawings generally represent the same element, and thus their description in some cases may be omitted.

Hereinafter, a DC-DC converter is described with reference to certain embodiments and the drawings for describing the embodiments.

FIG. 1 is a block diagram illustrating an organic light emitting display including a DC-DC converter according to an embodiment. Referring to FIG. 1, the organic light emitting display includes a pixel unit 20 having pixels 10 coupled to scan lines S1 to Sn and data lines D1 to Dm, a scan driver 30 for supplying scan signals to the pixels 10 through the scan lines S1 to Sn, a data driver 40 for supplying data signals to the pixels 10 through the data lines D1 to Dm, and a DC-DC converter 60 for supplying a first power voltage ELVDD and a second power voltage ELVSS to the pixels 10 and may further include a timing controller 50 for controlling the scan driver 30 and the data driver 40.

The pixels 10 that receives the first power voltage ELVDD and the second power voltage ELVSS from the DC-DC converter 60 generate light corresponding to the data signals by current that flows from the first power voltage ELVDD to the second power voltage ELVSS via organic light emitting diodes (OLED).

The scan driver 30 generates the scan signals by the control of the timing controller 50 and supplies the generated scan signals to the scan lines S1 to Sn. The data driver 40 generates the data signals by the control of the timing controller 50 and supplies the generated data signals to the data lines D1 to Dm. If the scan signals are sequentially supplied to the scan lines S1 to Sn, the pixels 10 are sequentially selected by lines and the selected pixels 10 receive the data signals transmitted from the data lines D1 to Dm.

Figure 2:
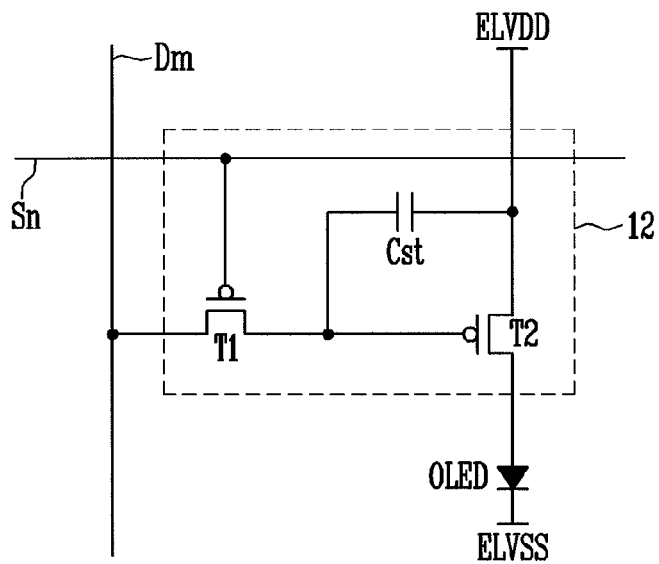
FIG. 2 is a schematic diagram the pixel of FIG. 1.

FIG. 2 is a schematic illustrating an embodiment of the pixel of FIG. 1. In particular, in FIG. 2, for convenience sake, the pixel coupled to the nth scan line Sn and the mth data line Dm will be illustrated. Referring to FIG. 2, each of the pixels 10 includes an organic light emitting diode (OLED) and a pixel circuit 12 coupled to the data line Dm and the scan line Sn to control the OLED.

The anode electrode of the OLED is coupled to the pixel circuit 12 and the cathode electrode of the OLED is coupled to the second power voltage ELVSS. The OLED generates light with brightness corresponding to the current supplied from the pixel circuit 12.

The pixel circuit 12 controls the amount of current supplied to the OLED according to the data signal supplied to the data line Dm when a scan signal is supplied to the scan line Sn. Therefore, the pixel circuit 12 includes a second transistor T2 coupled between the first power voltage ELVDD and the OLED, a first transistor T1 coupled between the second transistor T2, the data line, and the scan line Sn, and a storage capacitor Cst coupled between the gate electrode of the second transistor T2 and the first electrode of the second transistor T2.

The gate electrode of the first transistor T1 is coupled to the scan line Sn and the first electrode of the first transistor T1 is coupled to the data line Dm. The second electrode of the first transistor t1 is coupled to one terminal of the storage capacitor Cst. Here, the first electrode is set as one of a source electrode and a drain electrode and the second electrode is set as an electrode different from the first electrode. For example, when the first electrode is set as the source electrode, the second electrode is set as the drain electrode.

The first transistor T1 coupled to the scan line Sn and the data line Dm is turned on when the scan signal is supplied from the scan line Sn to supply the data signal supplied from the data line Dm to the storage capacitor Cst. Accordingly, the storage capacitor Cst charges the voltage corresponding to the data signal.

The gate electrode of the second transistor T2 is coupled to one terminal of the storage capacitor Cst and the first electrode of the second transistor T2 is coupled to the other terminal of the storage capacitor Cst and the first power voltage ELVDD. The second electrode of the second transistor T2 is coupled to the anode electrode of the OLED. The second transistor T2 controls the amount of current that flows from the first power voltage ELVDD to the second power voltage ELVSS via the OLED to correspond to the voltage value stored in the storage capacitor Cst. The OLED generates light corresponding to the amount of current supplied from the second transistor T2.

Since the above-described pixel structure of FIG. 2 is only an embodiment, the pixel 10 is not limited to the above pixel structure.

The DC-DC converter 60 receives an input power voltage Vin from a power source unit 70 and uses the input power voltage Vin to generate the first power voltage ELVDD and the second power voltage ELVSS supplied to the pixels 10. The first power voltage ELVDD may be set as a positive voltage and the second power voltage ELVSS may be set as a negative voltage.

The power source unit 70 may be a battery for providing a DC power source or a rectifying device for converting an AC power voltage into a DC power voltage to generate the input power voltage Vin. However, the power source unit 70 is not limited to the above.

Figure 3:
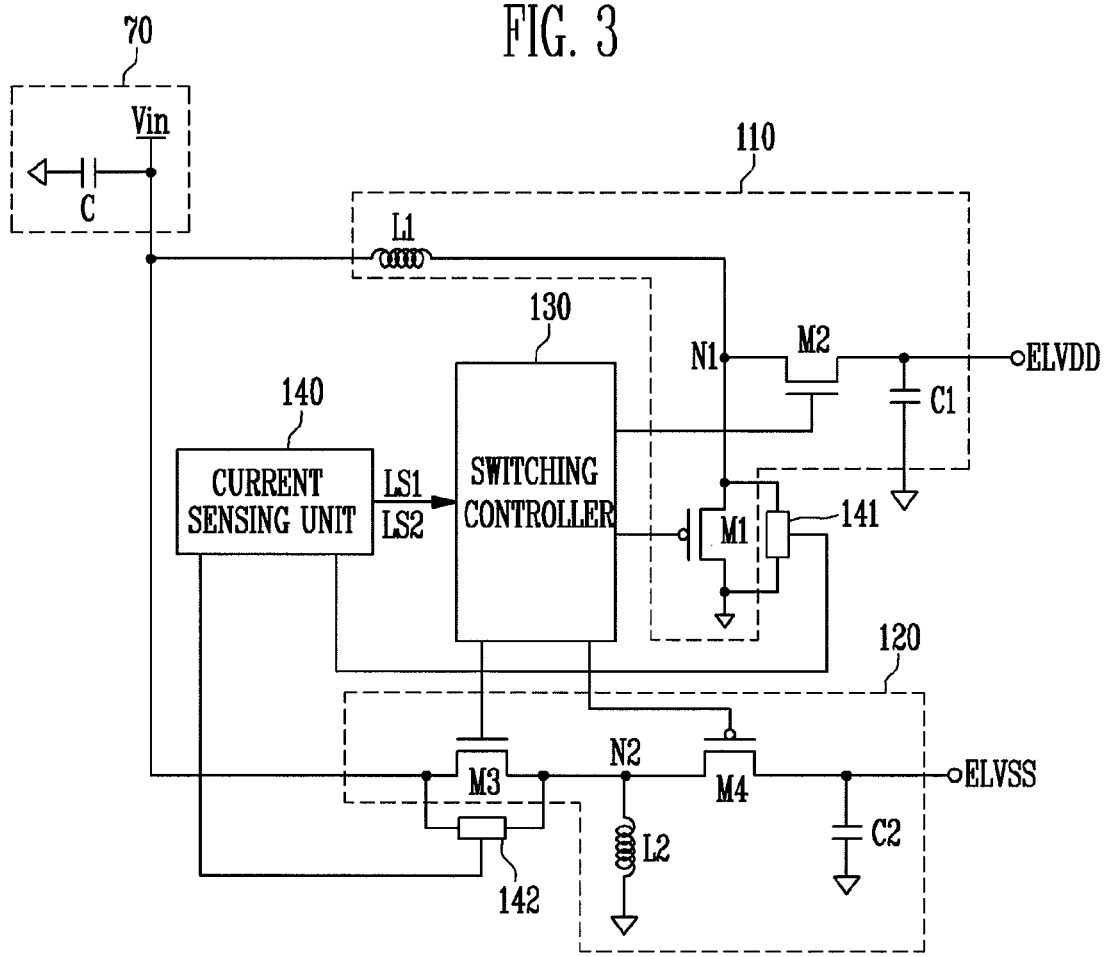
FIG. 3 is a block diagram illustrating a DC-DC converter according to an embodiment.

FIG. 3 is a view illustrating a DC-DC converter according to an embodiment. Referring to FIG. 3, the DC-DC converter 60 includes a boost converter 110, an inverting converter 120, a switching controller 130, and a current sensing unit 140 in order to perform the above-described operation.

The boost converter 110 includes a first switching element M1, a second switching element M2, and a first inductor L1 and may boost the input power voltage Vin supplied from the power source unit 70 to output the boosted input power voltage Vin to the first power voltage ELVDD.

The first switching element M1 and the second switching element M2 may be alternately turned on. That is, when the first switching element M1 is turned on, the second switching element M2 is turned off When the first switching element M1 is turned off, the second switching element M2 is turned on. In addition, the first switching element M1 and the second switching element M2 may be transistors having different polarities. For example, when the first switching element M1 is a P-type transistor, the second switching element M2 may be set as an N-type transistor. Alternatively, the first switching element M1 may be the N-type transistor and the second switching element M2 may be the P-type transistor.

The inverting converter 120 includes a third switching element M3, a fourth switching element M4, and a second inductor L2 and may invert the input power voltage Vin supplied from the power source unit 70 to output the inverted input power voltage Vin to the second power voltage ELVSS.

The third switching element M3 and the fourth switching element M4 may be alternately turned on. That is, when the third switching element M3 is turned on, the fourth switching element M4 is turned off. When the third switching element M3 is turned off, the fourth switching element M4 is turned on. In addition, the third switching element M3 and the fourth switching element M4 may be transistors having different polarities. For example, when the third switching element M3 is a P-type transistor, the fourth switching element M4 may be an N-type transistor. Alternatively, the third switching element M3 may be the N-type transistor and the fourth switching element M4 may be the P-type transistor.

The switching controller 130 controls the on-off operations of the switching elements M1, M2, M3, and M4 included in the boost converter 110 and the inverting converter 120 so that the first power voltage ELVDD and the second power voltage ELVSS are generated with the input power voltage Vin.

The current sensing unit 140 senses the amount of current that flows through the first inductor L1 of the boost converter 110 and supplies a first limit signal LS1 to the switching controller 130 when the amount of the sensed current is greater than or equal to a first reference current amount. That is, when the amount of current of the first inductor L1 deviates from a normal range, the current sensing unit 140 signals the switching controller 130.

In addition, the current sensing unit 140 may sense the current that flows through the second inductor L2 of the inverting converter 120 and may supply a second limit signal LS2 to the switching controller 130 when the amount of the sensed current is greater than or equal to a second reference current amount.

The switching controller 130 controls the first switching element M1 and the second switching element M2 included in the boost converter 110 to reduce the amount of current that flows through the first inductor L1 when the first limit signal LS1 is received from the current sensing unit 140. In detail, the duty ratios of the first switching element M1 and the second switching element M2 may be controlled to reduce the amount of current that flows through the first inductor L1. In addition, in the case of receiving the second limit signal LS2 from the current sensing unit 140, the switching controller 130 controls the third switching element M3 and the fourth switching element M4 included in the inverting converter 120 to reduce the amount of current that flows through the second inductor L2. In detail, the duty ratios of the third switching element M3 and the fourth switching element M4 may be controlled to reduce the amount of current that flows through the second inductor L2.

Therefore, in the case where the amount of current that flows through the first inductor L1 and/or the second inductor L2 deviates from a normal range, the current sensing unit 140 may supply the first limit signal LS1 and/or the second limit signal LS2 to the switching controller 130 to restore the amount of current that flows through the first inductor L1 and/or the second inductor L2 to be within a normal range.

Figure 4:
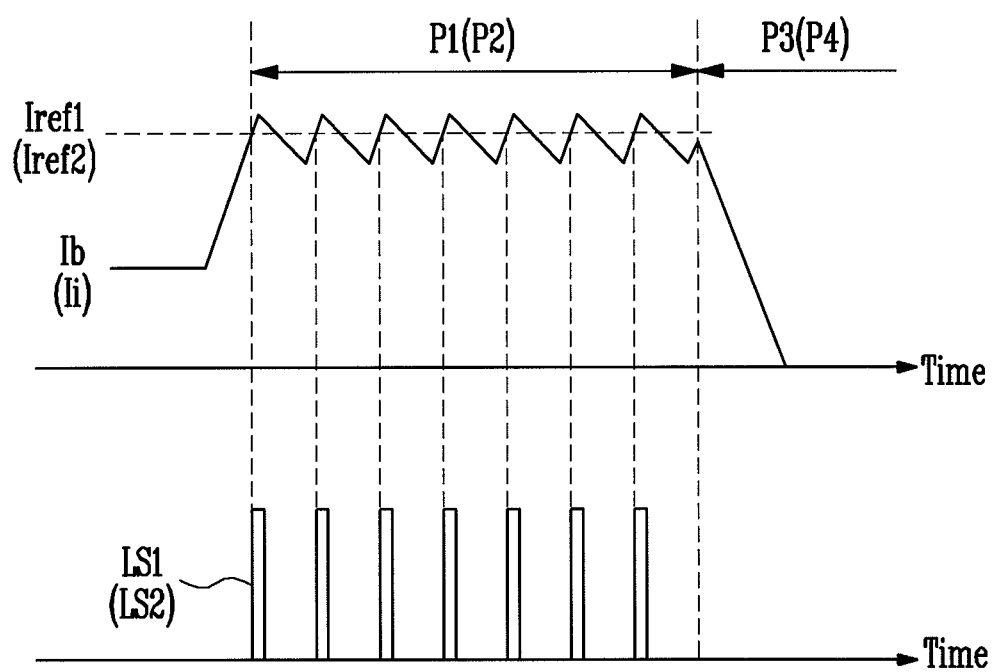
FIG. 4 is a waveform chart illustrating limit signals and currents that flow through inductors according to an embodiment.

FIG. 4 is a waveform chart illustrating limit signals and currents that flow through inductors according to an embodiment. When the currents of the inductors L1 and L2 increase, the currents of the inductors L1 and L2 may be easily restored to be within a normal range through a current limit operation of controlling the duty ratios of the switching elements M1, M2, M3, and M4 included in the converters 110 and 120. However, when the first power voltage ELVDD and the second power voltage ELVSS in the organic light emitting display are shorted due to, for example, a shock generated during using the organic light emitting display or a defect generated during manufacturing the organic light emitting display, since a large current is continuously received to the inductors L1 and L2, the currents of the inductors L1 and L2 may not be made within a normal range only by the current limit operation of controlling the duty ratios of the switching elements M1, M2, M3, and M4.

In detail, when the amount of current Ib that flows through the first inductor L1 of the boost converter 110 is described with reference to FIG. 4, the amount of current Ib of the first inductor L1 rapidly increases due to a short of the first power voltage ELVDD and the second power voltage ELVSS so that the first limit signal LS1 is supplied from the current sensing unit 140 to the switching controller 130 at the moment when the amount of current Ib of the first inductor L1 is larger than a first reference current amount Iref1.

The switching controller 130 that receives the first limit signal LS1 controls the duty ratios of the first switching element M1 and the second switching element M2 in the boost converter 110 to reduce the amount of current Ib of the first inductor L1 to be smaller than the first reference current amount Iref1. However, since the short of the first power voltage ELVDD and the second power voltage ELVSS continue, the amount of current Ib of the first inductor L1 increases and the above-described operation is repeated.

Therefore, when the first power voltage ELVDD and the second power voltage ELVSS are shorted, although the above-described current limit operation is repeated, the amount of current Ib of the first inductor L1 is not stable but overload and increase in temperature are generated due to the repeated current limit operation so that fire may be caused.

Therefore, in order to solve the above problem, the switching controller 130 may turn off the first switching element M1 and the second switching element M2 in the boost converter 110 when the first limit signal LS1 is supplied no less than a reference number of times within a short determining time P1.

For example, when it is assumed that the reference number of times is 7, in FIG. 4, since the first limit signal LS1 is supplied to the switching controller 130 seven times within the short determining time P1, the switching controller 130 turns off the first switching element M1 and the second switching element M2 so that, in a period P3 after the short determining time P1 has passed, the amount of current Ib of the first inductor L1 is rapidly reduced and that the current Ib finally does not exist. Therefore, when a fatal problem in which the first power voltage ELVDD and the second power voltage ELVSS are shorted is generated, the boost converter 110 may be rapidly shut down.

In addition, the short determining time P1 may be counted from the points of time where the first limit signal LS1 is supplied, respectively. In the above, only the boost converter 110 was described. However, the same description may be also applied to the inverting converter 120. That is, the switching controller 130 may turn off the third switching element M3 and the fourth switching element M4 in the inverting converter 120 in the case where the second limit signal LS2 is supplied no less than reference number of times within predetermined short determining time P2.

For example, when it is assumed that the reference number of times is 7, in FIG. 4, since the second limit signal LS2 is supplied to the switching controller 130 seven times within the short determining time P2, the switching controller 130 turns off the third switching element M3 and the fourth switching element M4 so that, in a period P4 after the short determining time P2 has passed, the amount of current Ii of the second inductor L2 is rapidly reduced and that the current Ii finally does not exist. Therefore, when a fatal problem in which the first power voltage ELVDD and the second power voltage ELVSS are shorted is generated, the inverting converter 120 may be rapidly shut down.

In addition, the short determining time P2 may be counted from the points of time where the second limit signal LS2 is supplied, respectively, and may be set to be the same as the short determining time P1 applied in the boost converter 110.

In addition, the short determining time P1 and the reference number of times applied in the boost converter 110 may be set to vary in accordance with the purpose, size, kind, and use environment of the organic light emitting display. In addition, the short determining time P2 and the reference number of times applied in the inverting converter 120 may be set to vary in accordance with the purpose, size, kind, and use environment of the organic light emitting display.

Hereinafter, the detailed structure and operation of the DC-DC converter 60 according to the embodiment of the present invention is described.

First, the boost converter 110 may include the first inductor L1 coupled between the power source unit 70 and the first node N1, the first switching element M1 coupled between the first node N1 and a ground power source, and the second switching element M2 coupled between the first node N1 and an output end for outputting the first power voltage ELVDD. In addition, a first capacitor C1 may be further coupled to the output end for outputting the first power voltage ELVDD.

Referring to FIG. 3, transistors are used as the switching elements M1 and M2 of the boost converter 110. The first inductor L1 has one terminal coupled to the power source unit 70 and has the other terminal coupled to the first node N1, the first transistor M1 has a first electrode coupled to the first node N1, a second electrode coupled to the ground power source, and a gate electrode coupled to the switching controller 130, and the second transistor M2 has a first electrode coupled to the first node N1, a second electrode coupled to the output end for outputting the first power voltage ELVDD, and a gate electrode coupled to the switching controller 130. In addition, the first capacitor C1 may be coupled to a contact point at which the second electrode of the second transistor M2 and the output end for outputting the first power voltage ELVDD meet each other. The first node N1 is a contact point at which the other terminal of the first inductor L1, the first electrode of the first transistor M1, and the first electrode of the second transistor M2 meet each other.

In FIG. 3, it is illustrated that the first transistor M1 is P-type and that the second transistor M2 is N-type. In some embodiments, the first transistor M1 may be N-type and the second transistor M2 may be P-type.

The inverting converter 120 may include the third switching element M3 coupled between the power source unit 70 and a second node N2, the second inductor L2 coupled between the second node N2 and the ground power source, and the fourth switching element M4 coupled between the second node N2 and an output end for outputting the second power voltage ELVSS. In addition, a second capacitor C2 may be further coupled to the output end for outputting the second power voltage ELVSS.

Referring to FIG. 3, transistors are used as the switching elements M3 and M4 of the inverting converter 120. The third transistor M3 has a first electrode coupled to the power source unit 70, a second electrode coupled to the second node N2, and a gate electrode coupled to the switching controller 130, the second inductor L2 has one terminal coupled to the ground power source and the other terminal coupled to the second node N2, and the fourth transistor M4 has a first electrode coupled to the second node N2, a second electrode coupled to the output end for outputting the second power voltage ELVSS, and a gate electrode coupled to the switching controller 130. In addition, the second capacitor C2 may be coupled to a contact point at which the second electrode of the fourth transistor M4 and the output end for outputting the second power voltage ELVSS meet each other.

The second node N2 is a contact point at which the other terminal of the second inductor L2, the second electrode of the third transistor M3, and the first electrode of the fourth transistor M4 meet each other.

In FIG. 3, the third transistor M3 is N-type and the fourth transistor M4 is P-type. However, in some embodiments, the third transistor M3 may be P-type and the fourth transistor M4 may be N-type.

Here, the boost converter 110 and the inverting converter 120 simultaneously operate. However, for convenience sake, the operations of the boost converter 110 and the inverting converter 120 will be separately described.

First, the switching controller 130 applies a low signal to the first transistor M1 and the second transistor M2 included in the boost converter 110. Then, the first transistor M1 is turned on and the second transistor M2 is turned off. Therefore, a closed circuit is formed between the first inductor L1 and the first transistor M1 of the boost converter 110. Therefore, the power source of the power source unit 70 is induced to the first inductor L1. That is, the power source from the power source unit 70 is stored in the first inductor L1. Therefore, the switching controller 130 corrects the duty ratio of the first transistor M1 to control the power source induced to the first inductor L1. That is, the voltage level induced to the first inductor L1 varies in accordance with the turn on time of the first transistor M1. The switching controller 130 applies a high signal to the first transistor M1 and the second transistor M2. As a result, the first transistor M1 of the boost converter 110 is turned off and the second transistor M2 is turned on.

Therefore, the voltage at both ends of the first inductor L1 of the boost converter 110 is directly transmitted to the first capacitor C1 through the second transistor M2. That is, the voltage of the first inductor L1 is charged in the first capacitor C1. In addition, the second transistor M2 and the first capacitor c1 output the positive first power voltage ELVDD to the pixel unit 20.

Then, the switching controller 130 applies a high signal to the third transistor M3 and the fourth transistor M4 of the inverting converter 120. Then, the third transistor M3 of the inverting converter 120 is turned on and the fourth transistor M4 is turned off. Therefore, a closed circuit is formed between the third transistor M3 of the inverting converter 120 and the second inductor L2. Therefore, the power source from the power source unit 70 is provided to the second inductor L2. That is, energy from the power source unit 70 is stored in the second inductor L2. The switching controller 130 corrects the duty ratio of the third transistor M3 to control the power source induced to the second inductor L2. That is, the voltage level induced to the second inductor L2 varies in accordance with the turn on time of the third transistor M3.

Then, the switching controller 130 applies a low signal to the third transistor M3 and the fourth transistor M4 of the inverting converter 120. As a result, the third transistor M3 of the inverting converter 120 is turned off and the fourth transistor M4 is turned on.

Therefore, the voltage at both ends of the second inductor L2 of the inverting converter 120 is inverted to be transmitted to the second capacitor C2 through the fourth transistor M4. That is, the voltage of the second inductor L2 is inverted to be charged in the second capacitor C2. In addition, the fourth transistor M4 and the second capacitor C2 output the negative second power voltage ELVSS to the pixel unit 20.

The current sensing unit 140 provides a first current measuring unit 141 and a second current measuring unit 142 in the boost converter 110 and the inverting converter 120 to measure the currents that flow through the inductors L1 and L2. For example, in the boost converter 110, the first current measuring unit 141 is provided on the side of the first transistor M1 to measure the amount of current that flows from the power source unit 70 to the first transistor M1 through the first inductor L1. In addition, in the inverting converter 120, the second current measuring unit 142 is provided on the side of the third transistor M3 to measure the amount of current that flows from the power source unit 70 to the second inductor L2 through the third transistor M3.

The current sensing unit 140 measures the amounts of currents that flow through the inductors L1 and L2 by the above-described method to supply the first limit signal LS1 to the switching controller 130 when the amount of current Ib that flows through the first inductor L1 is greater than or equal to the first reference current amount Iref1 and to supply the second limit signal LS2 to the switching controller 130 when the amount of current Ii that flows through the second inductor L2 is greater than or equal to the second reference current amount Iref2.

When the first limit signal LS1 is received from the current sensing unit 140, the switching controller 130 may control the duty ratios of the first transistor M1 and the second transistor M2 in the boost converter 110 to restore the amount of current Ib of the first inductor L1 to be smaller than the first reference current amount Iref1.

In addition, when the second limit signal LS2 is received from the current sensing unit 140, the switching controller 130 controls the duty ratios of the third transistor M3 and the fourth transistor M4 in the inverting converter 120 to restore the amount of current Ii of the second inductor L2 to be smaller than the second reference current amount Iref2.

In the case where the first limit signal LS1 is supplied greater than or equal to a reference number of times within the predetermined short determining time P1, the switching controller 130 may turn off the first transistor M1 and the second transistor M2 in the boost converter 110. In addition, in the case where the second limit signal LS2 is supplied greater than or equal to a reference number of times within the predetermined short determining time P2, the switching controller 130 may turn off the third transistor M3 and the fourth transistor M4 in the inverting converter 120.

That is, when it is determined that a short circuit exists between the first power voltage ELVDD and the second power voltage ELVSS in the organic light emitting display, the boost converter 110 and the inverting converter 120 may be shut down so that it is possible to prevent fire from being caused by the short.

While various features and aspects have been described in connection with certain exemplary embodiments, it is to be understood that the invention is not limited to the disclosed embodiments, but, on the contrary, is intended to cover various modifications and equivalent arrangements.

What is claimed is:

1. A DC-DC converter, comprising:
    a boost converter including a first switching element, a second switching element, and a first inductor;
    an inverting converter including a third switching element, a fourth switching element, and a second inductor;
    a switching controller for controlling the first, second, third, and fourth switching elements; and
    a current sensing unit for sensing an amount of current that flows through the first inductor and for supplying a first limit signal to the switching controller if the amount of sensed current is greater than or equal to a first reference current amount,
    wherein the switching controller controls the first switching element and the second switching element to reduce the amount of current that flows through the first inductor if the first limit signal is received and turns off the first switching element and the second switching element if the first limit signal is supplied more than a reference number of times within a first reference time.

2. The DC-DC converter as claimed in claim 1,
    wherein the current sensing unit senses an amount of current that flows through the second inductor and supplies a second limit signal to the switching controller if the amount of sensed current is greater than or equal to a second reference current amount, and
    wherein the switching controller controls the third switching element and the fourth switching element to reduce the amount of current that flows through the second inductor if the second limit signal is received and turns off the third switching element and the fourth switching element if the second limit signal is supplied more than a reference number of times within a second reference time.

3. The DC-DC converter as claimed in claim 1,
    wherein the boost converter outputs a first power voltage obtained by boosting an input power voltage supplied by a power source unit by control of the switching controller, and
    wherein the inverting converter outputs a second power voltage obtained by inverting the input power source by control of the switching controller.

4. The DC-DC converter as claimed in claim 3, wherein the boost converter comprises:
    a first inductor coupled between the power source unit and a first node;
    a first switching element coupled between the first node and a ground power source; and
    a second switching element coupled between the first node and an output for outputting the first power voltage.

5. The DC-DC converter as claimed in claim 4, wherein the boost converter further comprises a first capacitor coupled to the output.

6. The DC-DC converter as claimed in claim 3, wherein the inverting converter comprises:
    a third switching element coupled between the power source unit and a second node;
    a second inductor coupled between the second node and a ground power source; and
    a fourth switching element coupled between the second node and an output for outputting the second power voltage.

7. The DC-DC converter as claimed in claim 6, wherein the inverting converter further comprises a second capacitor coupled to the output.

8. The DC-DC converter as claimed in claim 1, wherein the second switching element of the boost converter is turned off if the first switching element is turned on and is turned on if the first switching element is turned off.

9. The DC-DC converter as claimed in claim 1, wherein the fourth switching element of the inverting converter is turned off if the third switching element is turned on and is turned on if the third switching element is turned off.

10. The DC-DC converter as claimed in claim 1, wherein the first switching element and the second switching element are transistors having different polarities.

11. The DC-DC converter as claimed in claim 1, wherein the third switching element and the fourth switching element are transistors having different polarities.

12. The DC-DC converter as claimed in claim 3,
wherein a first power source output from the boost converter has a positive voltage, and
wherein a second power source output from the inverting converter has a negative voltage.

13. An organic light emitting display, comprising:
a pixel unit coupled to scan lines and data lines and including pixels that receive a first power voltage and a second power voltage;
a scan driver for supplying scan signals to the pixels through the scan lines;
a data driver for supplying data signals to the pixels through the data lines; and
a DC-DC converter for generating the first power voltage and the second power voltage and configured to supply the generated first and second power voltages to the pixel unit,
wherein the DC-DC converter comprises:
a boost converter including a first switching element, a second switching element, and a first inductor;
an inverting converter including a third switching element, a fourth switching element, and a second inductor;
a switching controller for controlling the first, second, third, and fourth switching elements; and
a current sensing unit for sensing the amount of current that flows through the first inductor and for supplying a first limit signal to the switching controller if the amount of sensed current is greater than or equal to a first reference current amount,
wherein the switching controller controls the first switching element and the second switching element to reduce the amount of current that flows through the first inductor if the first limit signal is received and turns off the first switching element and the second switching element if the first limit signal is supplied more than a reference number of times within a first reference time.

14. The organic light emitting display as claimed in claim 13,
wherein the current sensing unit senses the amount of current that flows through the second inductor and supplies a second limit signal to the switching controller if the amount of sensed current is greater than or equal to a second reference current amount, and
wherein the switching controller controls the third switching element and the fourth switching element to reduce the amount of current that flows through the second inductor if the second limit signal is received and turns off the third switching element and the fourth switching element if the second limit signal is supplied more than a reference number of times within a second reference time.

15. The organic light emitting display as claimed in claim 13,
wherein the boost converter outputs a first power voltage obtained by boosting an input power voltage supplied from a power source unit by control of the switching controller, and
wherein the inverting converter outputs a second power voltage obtained by inverting the input power source by control of the switching controller.

16. The organic light emitting display as claimed in claim 15, wherein the boost converter comprises:
a first inductor coupled between the power source unit and a first node;
a first switching element coupled between the first node and a ground power source; and
a second switching element coupled between the first node and an output for outputting the first power voltage.

17. The organic light emitting display as claimed in claim 16, wherein the boost converter further comprises a first capacitor coupled to the output.

18. The organic light emitting display as claimed in claim 15, wherein the inverting converter comprises:
a third switching element coupled between the power source unit and a second node;
a second inductor coupled between he second node and a ground power source; and
a fourth switching element coupled between the second node and an output for outputting the second power voltage.

19. The organic light emitting display as claimed in claim 18, wherein the inverting converter further comprises a second capacitor coupled to the output.

20. The organic light emitting display as claimed in claim 13, wherein the second switching element of the boost converter is turned off if the first switching element is turned on and is turned on if the first switching element is turned off.

21. The organic light emitting display as claimed in claim 13, wherein the fourth switching element of the inverting converter is turned off if the third switching element is turned on and is turned on if the third switching element is turned off.

22. The organic light emitting display as claimed in claim 13, wherein the first switching element and the second switching element are transistors having different polarities.

23. The organic light emitting display as claimed in claim 13, wherein the third switching element and the fourth switching element are transistors having different polarities.

24. The organic light emitting display as claimed in claim 15,
wherein a first power source output from the boost converter has a positive voltage, and
wherein a second power source output from the inverting converter has a negative voltage.

* * * * *

UNITED STATES PATENT AND TRADEMARK OFFICE
CERTIFICATE OF CORRECTION

PATENT NO. : 8,933,922 B2
APPLICATION NO. : 13/249684
DATED : January 13, 2015
INVENTOR(S) : Sung-Cheon Park Page 1 of 1

It is certified that error appears in the above-identified patent and that said Letters Patent is hereby corrected as shown below:

In the Specification

In column 3 at line 64, Change "t1" to --T1--.

In column 8 at line 35, Change "c1" to --C1--.

In the Claims

In column 12 at line 24 (approx.), In Claim 18, change "he" to --the--.

Signed and Sealed this
Twenty-ninth Day of December, 2015

Michelle K. Lee
*Director of the United States Patent and Trademark Office*